US006868666B2

(12) United States Patent
Frank et al.

(10) Patent No.: US 6,868,666 B2
(45) Date of Patent: Mar. 22, 2005

(54) METHOD AND APPARATUS FOR MONITORING CATALYST EFFICIENCY AND OUTLET OXYGEN SENSOR PERFORMANCE

(75) Inventors: David A. Frank, Rochester Hills, MI (US); Igor Anilovich, Walled Lake, MI (US); Wenbo Wang, Novi, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/408,954

(22) Filed: Apr. 8, 2003

(65) Prior Publication Data

US 2004/0200208 A1 Oct. 14, 2004

(51) Int. Cl.[7] .................................................. F01N 3/00
(52) U.S. Cl. .............................. 60/277; 60/274; 60/276; 123/688; 123/690; 73/118.1; 73/23.31
(58) Field of Search ......................... 60/274, 276, 277, 60/285; 123/688, 690; 73/118.1, 23.31, 23.32

(56) References Cited

U.S. PATENT DOCUMENTS

| 5,877,413 | A | * | 3/1999 | Hamburg et al. | ........... 73/118.1 |
| 5,921,078 | A | * | 7/1999 | Takaku et al. | ................ 60/277 |
| 6,453,663 | B1 | * | 9/2002 | Orzel et al. | ................... 60/277 |
| 6,698,187 | B2 | * | 3/2004 | Nishioka et al. | .............. 60/277 |

* cited by examiner

Primary Examiner—Binh Q. Tran
(74) Attorney, Agent, or Firm—Christopher DeVries

(57) ABSTRACT

A vehicle exhaust system includes a catalytic converter and an outlet sensor. The outlet sensor generates a sensor signal based on an oxygen level of exhaust gases exiting the catalytic converter. A controller communicates with an engine and the outlet sensor, and monitors the sensor signal during a predetermined period of engine operation. The controller commands an intrusive catalyst monitor test in a default order if the outlet sensor signal transitions through both thresholds during a predetermined period. The controller performs an intrusive outlet sensor test during cruise operation of the engine if the signal fails to transition through both thresholds during the catalyst monitor test.

16 Claims, 3 Drawing Sheets

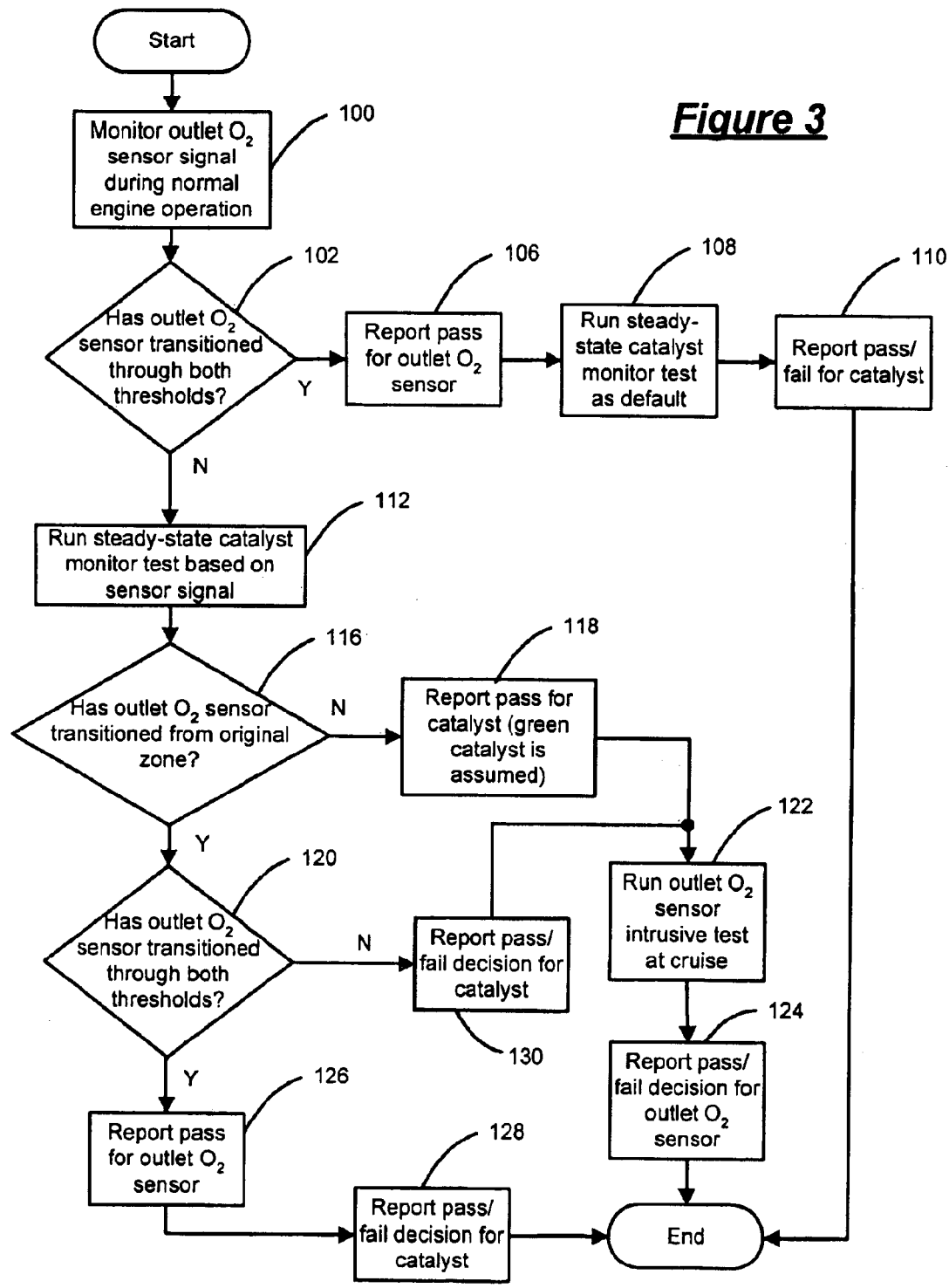

METHOD AND APPARATUS FOR MONITORING CATALYST EFFICIENCY AND OUTLET OXYGEN SENSOR PERFORMANCE

FIELD OF THE INVENTION

The present invention relates to diagnostic systems for vehicles, and more particularly to a method and apparatus for monitoring catalytic converter and outlet oxygen sensor performance.

BACKGROUND OF THE INVENTION

During the combustion process of an internal combustion engine, gasoline is oxidized and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds.

An exhaust system of the vehicle includes a catalytic converter that reduces CO, HC and $NO_x$ in the exhaust gas. The efficiency of the catalytic converter is periodically monitored to prevent excess CO, HC and $NO_x$ in the exhaust gas. Typically, the catalytic converter is monitored during steady state engine operation. At idle, for example, the engine controller adjusts the air to fuel (A/F) ratio to achieve consistent emissions output. Traditional monitoring methods force the A/F ratio to a lean or rich condition for a predetermined period. Afterwards, the controller switches to rich or lean conditions. The controller estimates an oxygen storage capacity (OSC) of the catalytic converter based on a lag time between an inlet oxygen sensor and an outlet oxygen sensor detecting the lean/rich condition. The OSC is indicative of the efficiency of the catalytic converter.

Proper function of the outlet oxygen sensor is required for accurate testing of the catalytic converter. However, because of a lag through the catalytic converter response of the outlet oxygen sensor signal is delayed to that of the inlet oxygen sensor signal. For this reason, it is problematical to detect a faulty outlet oxygen sensor using a passive mode only. Thus, a second intrusive diagnostic is traditionally required to confirm proper function of the outlet oxygen sensor. The intrusive tests adversely impact engine stability and exhaust emission levels, eliminate effective closed-loop control, decrease long and short term learning, and disable operation of other vehicle diagnostics. For this reason, minimizing an intrusive time is beneficial for engine operation.

SUMMARY OF THE INVENTION

Accordingly, the present invention provides a vehicle exhaust system including a catalytic converter and an outlet sensor. The outlet sensor generates a sensor signal based on an oxygen level of exhaust gases exiting the catalytic converter. A controller communicates with an engine and the outlet sensor. The controller monitors the sensor signal during a predetermined period of engine operation. The controller commands a catalyst monitor test based on the outlet sensor signal if the sensor signal fails to transition during the predetermined period. The controller performs an intrusive outlet sensor test during cruise operation of the engine if the signal fails to transition during the catalyst monitor test.

In one feature, the controller reports a pass status for the outlet sensor and performs the catalyst monitor test if the signal transitions through both rich and lean thresholds during the predetermined period.

In another feature, the controller indicates the catalytic converter as green and reports a pass status of the catalytic converter if the signal fails to transition from the original zone during the catalyst monitor test.

In yet another feature, the controller reports a test status of the catalytic converter if the signal fails to transition through rich and lean thresholds during the catalyst monitor test.

In still another feature, the controller reports a pass status of the outlet sensor if the signal transitions through rich and lean thresholds during the catalyst monitor test.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a flowchart illustrating a method for monitoring catalyst efficiency and outlet oxygen sensor operation.

DETAILED DESCRIPTION OF THE PREFERRED EMBODIMENTS

Figure 1:
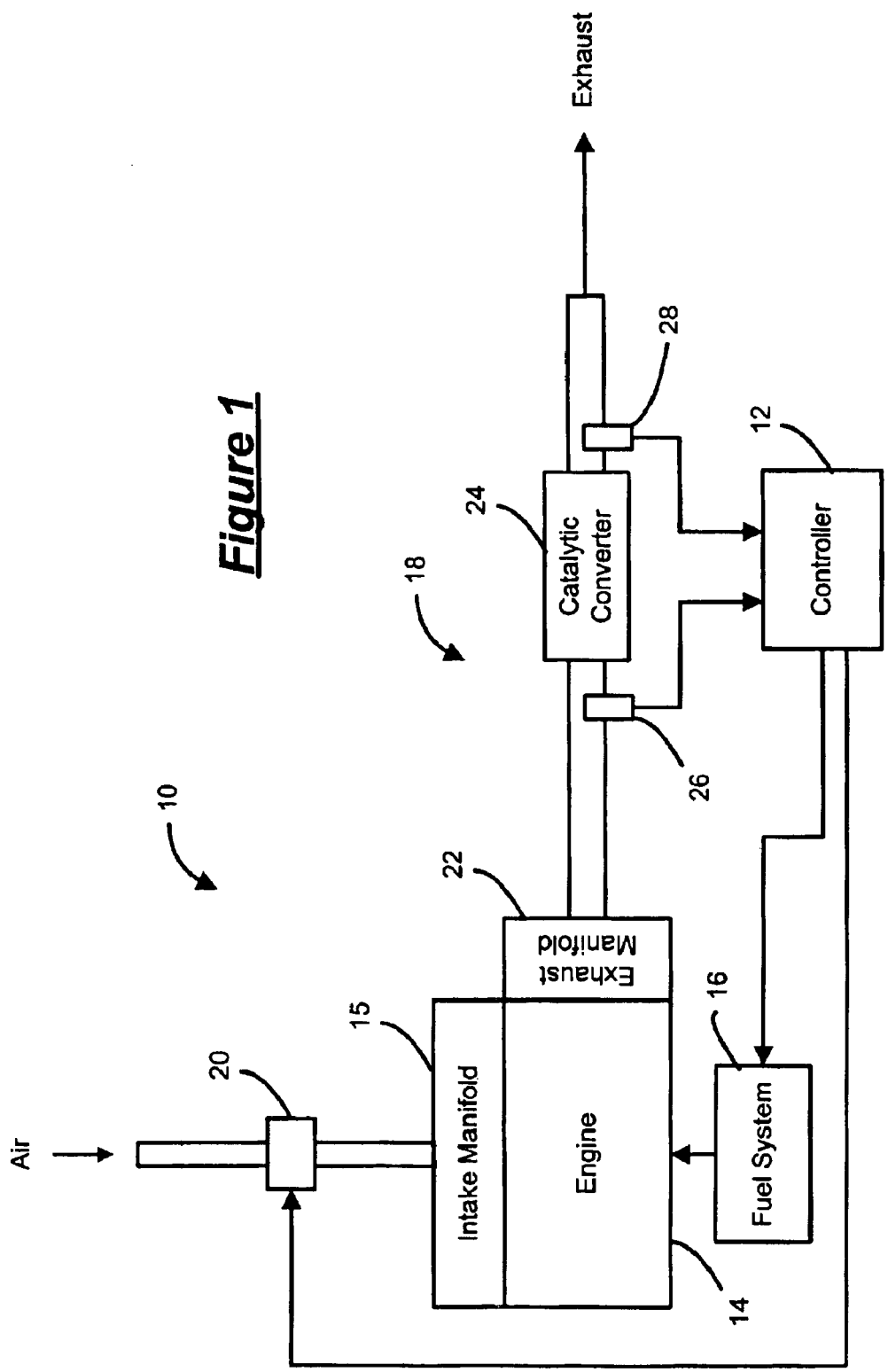
FIG. 1 is a functional block diagram of a vehicle exhaust system.

The following description of the preferred embodiment is merely exemplary in nature and is in no way intended to limit the invention, its application, or uses. For purposes of clarity, the same reference numbers will be used in the drawings to identify similar elements.

Referring now to FIG. 1, a vehicle 10 includes a controller 12, an engine 14, a fuel system 16, and an exhaust system 18. A throttle 20 communicates with the controller 12 to control air flow into an intake manifold 15 of the engine 14. The amount of power produced by the engine 14 is proportional to mass air flow (MAF) into the engine 14. The engine 14 operates in a lean condition (i.e., reduced fuel) when the A/F ratio is higher than a stoichiometric A/F ratio. The engine 14 operates in a rich condition when the A/F ratio is less than the stoichiometric A/F ratio. Internal combustion within the engine 14 produces exhaust gas that flows from the engine 14 to the exhaust system 18, which treats the exhaust gas and releases the exhaust gas to the atmosphere. The controller 12 communicates with the fuel system 16 to control the fuel supply to the engine 14.

The exhaust system 18 includes an exhaust manifold 22, a catalytic converter 24, an inlet oxygen ($O_2$) sensor 26 located upstream from the catalytic converter 24, and an outlet ($O_2$) sensor 28 located downstream from the catalytic converter 24. The catalytic converter 24 controls emissions by increasing the rate of oxidization of hydrocarbons (HC) and carbon monoxide (CO) and the rate of reduction of nitrogen oxides ($NO_x$). To enable oxidization, the catalytic converter 24 requires air or $O_2$. The $O_2$ storage capacity of the catalytic converter 24 is indicative of the catalytic converter's efficiency in oxidizing the HC and CO and in reducing $NO_x$. The inlet $O_2$ sensor 26 communicates with the controller 12 and measures the $O_2$ content of the exhaust stream entering the catalytic converter 24. The outlet $O_2$ sensor 28 communicates with the controller 12 and measures the $O_2$ content of the exhaust stream exiting the catalytic converter 24.

Figure 2:
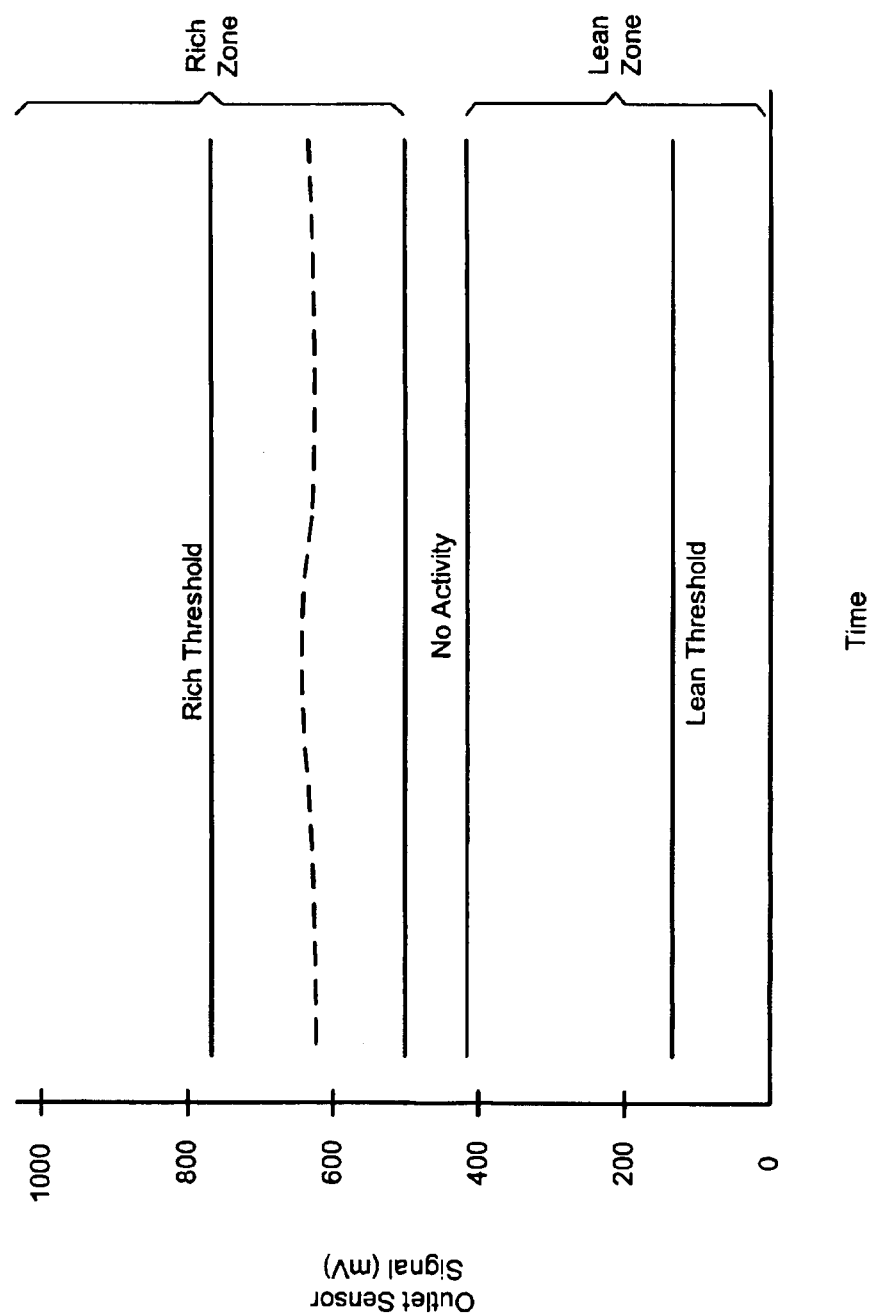
FIG. 2 is a graph showing outlet oxygen sensor voltage as a function of time.

Referring now to FIG. 2, a sensor signal of the outlet $O_2$ sensor 28 is represented as a dashed line plotted as a function of time. The sensor signal is based on the $O_2$ content of the exhaust passing thereby. In one exemplary embodiment, the sensor signal is characterized with respect to three zones: rich, no activity, and lean. The rich zone includes the area above the no activity zone and a rich threshold. The lean zone includes the area below the no activity zone and a lean threshold. The sensor signal moves or transitions across these zones or remains within a particular zone based on the particular operation of the engine 14. As used herein, the term transition refers to the movement of the sensor signal between the rich and lean zones. As shown in FIG. 2, the sensor signal remains in the rich zone.

With reference to FIG. 3, a method of monitoring the $O_2$ storage capacity of the catalytic converter 24 and function of the outlet $O_2$ sensor 28 is shown. Control begins with step 100 where the controller 12 monitors the outlet $O_2$ sensor during normal engine operation. During normal engine operation, the A/F ratio transitions between rich and lean. The controller 12 passively monitors the outlet $O_2$ sensor signal for a transition across both rich and lean thresholds as the engine 14 operates.

In step 102, the controller 12 determines whether the outlet $O_2$ sensor transitioned through both the rich and lean thresholds during the monitoring period. If the outlet $O_2$ sensor transitioned through both thresholds, a test pass state is reported in step 106. After reporting the test pass state in step 106, the controller 12 continues with steps 108 and 110 by respectively performing a catalyst monitor test, described in detail below, and reporting a pass/fail status based on the results. The catalyst monitor test is performed during steady-state operation of the engine 14. One example of steady-state operation is idle, however, it is appreciated that the catalyst monitoring test can be performed during any steady-state period of engine operation.

If the outlet $O_2$ sensor failed to transition through both rich and lean thresholds, the controller 12 continues with step 112 by commanding a catalyst monitor test. The controller 12 commands the A/F ratio to a lean or rich condition for a predetermined period. The condition is determined by the outlet $O_2$ sensor monitoring results and the particular zone that the sensor signal is stuck in. For example, if the sensor signal has transitioned through the rich threshold, but not through the lean threshold, regardless of which zone the signal is stuck in, the controller 12 commands the lean condition first and vice versa. Similarly, if the sensor signal failed to transition through both the rich and lean thresholds and the signal is stuck in the lean zone, the controller 12 commands the rich condition first and vice versa. After the predetermined period expires, the controller 12 switches to the opposing condition (e.g., if a rich condition was commanded, the controller 12 switches to command lean after the predetermined period expires). The controller 12 estimates an oxygen storage capacity (OSC) of the catalytic converter based on a lag time between the inlet $O_2$ sensor 26 and the outlet $O_2$ sensor 28 signals detecting the lean/rich condition. The OSC is indicative of the efficiency of the catalytic converter 24.

In step 116, the controller 12 determines whether the outlet $O_2$ sensor 28 transitioned from its original zone during the catalyst monitor test. If not, the controller 12 continues with step 118. If so, the controller 12 continues with step 120.

If the outlet $O_2$ sensor 28 fails to transition from its original zone during the catalyst monitor test, the OSC cannot be determined. However, if the catalytic converter 24 is new or "green", a transition by the outlet $O_2$ sensor 28 would be delayed for an extended period of time, and results in the failure of the outlet $O_2$ sensor 28 to transition. As a result, in step 118, a test pass state is reported for the catalytic converter under the assumption that the catalytic converter 24 is green.

The catalytic converter 24 is characterized as green if the time between the inlet $O_2$ sensor 26 and the outlet $O_2$ sensor 28 signals sensing a rich or lean transition is greater than a threshold time. For example, if a particular catalytic converter 24 includes a threshold time of 7 seconds, the catalytic converter 24 is deemed green if the outlet $O_2$ sensor 28 fails to transition within 7 seconds of the inlet $O_2$ sensor 26 transitioning. It will be appreciated that the threshold time will vary according to the particular catalytic converter 24.

In step 122, an intrusive test at cruise is performed to confirm malfunction of the outlet $O_2$ sensor 28. Generally, when the engine 14 is operating at cruise the controller 12 commands either a rich or lean A/F ratio. If the outlet $O_2$ sensor 28 is stuck in the rich zone then a lean A/F ratio is commanded and vice-versa. The controller 12 monitors the sensor signal from the inlet $O_2$ sensor 26 to confirm that the inlet $O_2$ sensor 26 detects the rich or lean condition. The controller 12 also monitors the outlet $O_2$ sensor 28 for a transition within a predetermined time period. If the outlet $O_2$ sensor 28 transitions through rich and/or lean thresholds within the predetermined time period, then a test pass state is reported in step 124. If the outlet $O_2$ sensor 28 fails to transition through rich and/or lean thresholds within the predetermined time period, then a test fail state is reported in step 124. If the inlet $O_2$ sensor 26 fails to detect the commanded A/F ratio, a general system fault is reported.

In step 120, the controller 12 determines if the outlet $O_2$ sensor 28 signal transitioned through both the rich and lean thresholds during the steady-state catalyst monitor test. If so, the controller 12 continues with steps 126 and 128 and reports a test pass state for the outlet $O_2$ sensor 28 and a pass/fail decision for the catalytic converter 24 based on a calculated OSC. If not, the controller 12 continues with step 130 to report a pass/fail decision for the catalytic converter 24 based on a calculated OSC. The controller 12 continues with steps 122 and 124 to run an intrusive test for the outlet $O_2$ sensor.

The method of the present invention reduces the intrusive test time to diagnose the $O_2$ storage capacity of the catalytic converter 24 and function of the outlet $O_2$ sensor 28. This is achieved by assuming proper function of the outlet $O_2$ sensor 28 until proven otherwise via the intrusive cruise test in step 122.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A monitoring system for a vehicle exhaust system comprising:

a catalytic converter;

an outlet sensor that generates a sensor signal based on an oxygen level of exhaust gases exiting said catalytic converter; and a controller that communicates with said outlet sensor, that monitors said sensor signal during a predetermined period of engine operation, that commands a catalyst monitor test based on said sensor signal if said sensor signal fails to transition during said predetermined period, and that performs an intrusive outlet sensor test during cruise operation of said engine if said sensor signal fails to transition during said catalyst monitor test.

2. The monitoring system of claim 1 wherein said controller reports a pass status for said outlet sensor and performs a catalyst monitor test if said sensor signal transitions during said predetermined period.

3. The monitoring system of claim 1 wherein said controller indicates said catalytic converter as green and reports a pass status of said catalytic converter if said sensor signal fails to transition during said catalyst monitor test.

4. The monitoring system of claim 1 wherein said controller reports a test status of said catalytic converter if said sensor signal fails to transition through rich and lean thresholds during said catalyst monitor test.

5. The monitoring system of claim 1 wherein said controller reports a pass status of said outlet sensor it said sensor signal transitions through rich and lean thresholds during said catalyst monitor test.

6. A method of monitoring an outlet oxygen sensor comprising:

monitoring a sensor signal of said outlet oxygen sensor during a predetermined period of operation of an engine;

commanding a catalyst monitor test based on said sensor signal if said sensor signal fails to transition during said predetermined period; and performing an intrusive outlet oxygen sensor test during cruise operation at said engine if said sensor signal fails to transition during said catalyst monitor test.

7. The method of claim 6 further comprising:

reporting a pass status for said outlet sensor and performing a catalyst monitor test if said sensor signal transitions during said predetermined period.

8. The method of claim 6 further comprising:

indicating said catalytic converter as green and reporting a pass status of said catalytic converter if said sensor signal fails to transition during said catalyst monitor test.

9. The method of claim 6 further comprising reporting a pass/fail status of said catalytic converter if said sensor signal fails to transition through rich and lean thresholds during said catalyst monitor test.

10. The method of claim 9 further comprising performing an intrusive outlet oxygen sensor test during cruise operation of said engine.

11. The method of claim 6 further comprising reporting a pass status of said outlet sensor if said sensor signal transitions through rich and lean thresholds during said catalyst monitor test.

12. A method of monitoring performance of a catalytic converter and outlet oxygen sensor comprising:

monitoring a sensor signal of said outlet oxygen sensor for a predetermined period during engine operation;

reporting a pass status for said outlet sensor if said sensor signal transitions during said predetermined antecedent period;

commanding a catalyst monitor test based on said sensor signal if said sensor signal fails to transition during said predetermined period;

reporting a pass status of said catalytic converter if said sensor signal fails to transition during said catalyst monitor test; and performing an intrusive outlet oxygen sensor test during cruise operation of said engine if said sensor signal fails to transition during said catalyst monitor test.

13. The method of claim 12 further comprising performing a catalyst monitor test if said sensor signal transitions during said predetermined period.

14. The method of claim 12 further comprising indicating said catalytic converter as green if said sensor signal fails to transition during said catalyst monitor test.

15. The method of claim 12 further comprising reporting a pass/fail status of said catalytic converter if said sensor signal fails to transition through rich and lean thresholds during said catalyst monitor test.

16. The method of claim 12 further comprising reporting a pass status of said outlet sensor if said sensor signal transitions through rich and lean thresholds during said catalyst monitor test.

* * * * *